Patented May 3, 1949

2,469,090

UNITED STATES PATENT OFFICE 2,469,090

EXTRACTION OF ACONITIC ACID FROM SUGAR CANE

Emil K. Ventre, Baton Rouge, La., assignor to the United States of America as represented by the Secretary of Agriculture No Drawing. Application May 2, 1946,
Serial No. 666,782

4 Claims. (Cl. 127—42)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a method for the extraction of aconitic acid as an alkaline earth salt from sugarcane. The extraction of aconitic acid as aconitate from sorgo sirups is given in United States Patent No. 2,280,085, Sugar from sorghum juices, Ventre et al., and an improvement upon this method is the subject of United States Patent No. 2,359,537, Process for the extraction of aconitic acid from plant juices, Ventre et al. In both of these patents the extraction of aconitates is from the sirup and is adaptable to sugar plant juices having sufficient quantities of aconitic acid to permit treating of the volume of material found at the sirup stage of the sugar manufacturing process. There are other sugar plants in which the aconitic acid content of the juices is not sufficient to warrant treating the sirup for its extraction. This I find to be true of sugarcane varieties used for the manufacture of sugar in Louisiana, at the present time, which contain only 25 to 40 percent of the aconitic acid present in sorgo, and this makes it necessary to select another stage of the manufacturing process for the extraction of the aconitic acid as aconitate. It follows that the molasses, either first, second, or third, should contain a concentration of aconitic acid greater than that of the sirup; and I have found this to be true. The application of my process may be to any of these sugar liquors; but for reasons of minimum volume, and yet to benefit by the improvement in purity of the liquor treated for aconitate removal, it is more economical to utilize the "B" molasses; that is, the molasses produced in the process just before the final, or discarded molasses is produced. This, in present sugar practice, is usually the molasses used to make crystallizer massecuites. In the manufacture of raw sugar from sugarcane, it has been the practice to use as little lime as possible for the clarification of the juices, so that these juices do not scale the heating surfaces. This scaling is primarily a deposition of the salts of aconitic acid on the heating surfaces whose temperatures are above 60° C. This method prevents, to some extent, scaling by the alkaline earth salts of aconitic acid; and it is found that aconitates precipitate in the sugar-boiling process, and may be removed from the molasses by diluting and heating without further treatment, to the extent of approximately 1 pound of the calcium aconitate per ton of sugarcane. The remaining aconitate in solution in the molasses must be treated to bring about conditions for its precipitation. I find that this can thus be done by the combined use of calcium hydroxide, calcium chloride, and heating. One example of my process is as follows:

Example I

Sugarcane juice which had been treated by lime and heat to give a clarified juice of pH 6.0 to 7.0 is concentrated and crystallized to molasses. The "B" molasses obtained therefrom is diluted to 26° to 30° Baumé and heated above 60° C. and allowed to settle, the aconitate being precipitated and decanted. The aconitic acid content of supernatant molasses is determined, and 10 to 40 percent of the aconitic acid equivalent of calcium chloride is added; the mixture is then limed to a pH such that, after again raising the temperature to above 60° and allowing the precipitated aconitate to settle, the supernatant molasses will have a pH of from 6.8 to 7, but not exceeding 7. The molasses so treated will be found to have its purity increased from 1 to 2 points and is returned to the usual boiling process.

I have found that it is impossible to set an exact rule for the amount of calcium chloride and lime to be added inasmuch as the pH change, which is important to the efficient operation of the process, varies with the juices, and, for this reason, it is best to make trial precipitations in the laboratory to determine the quantity of calcium chloride and lime to be added for maximum precipitation. Usually, it is only necessary to run a series of calcium chloride additions from 10 to 40 percent of the aconitic acid equivalent and to lime these from pH 7.2 to 8.0.

When sugarcane juices are limed so as to produce a clarified juice, neutral or nearly neutral, there results a precipitation of aconitate in the concentration process where temperatures above 60° C. occur. This precipitated aconitate interferes with the refining quality of the first sugars produced and is largely removed with these first sugars. The crystalline aconitate adheres to the sugar crystals, and, as it is not water soluble, cannot be completely removed by washing in the centrifugal.

When sugarcane juices are limed so as to produce clarified juice of 6.1 to 6.4 pH, this will substantially prevent the precipitation of calcium aconitate in the concentrating process. I have found that precipitation does occur on concentration of the aconitate in the molasses with the formation of crystalline aconitate concentrated in the lower purity molasses and lower purity massecuites. This concentration of aconitate is frequently such that it interferes with the centrifuging of the low purity massecuites. When this condition occurs, there is a concentration of aconitate crystals in the low grade sugar, and, inasmuch as this sugar is usually carried back as "seed" for the first sugar, the aconitate will be carried through to the first sugar resulting in a similar condition as obtained when juices are limed so as to give clarified juices above neutrality. The application of my process for the removal of aconitate is, in addition to being a process for the extraction of aconitate, also a method for securing improved quality sugars and an increased yield of sugar from sugarcane juices.

Aconitates extracted by these methods are principally calcium but contain 1 to 3.0 percent magnesium expressed as magnesium oxide.

The new process is further exemplified by the following procedures:

Example II

Treating sugarcane juices with lime, and then heating and settling to give a cleared juice of between 6.0 and 7.0 pH; concentrating into sirups, crystallizing sugars therefrom; diluting the resulting molasses to 26° to 30° Baumé with water; heating to above 60° C.; separating, washing, and drying the aconitates formed, and returning the molasses so treated to the crystallizing process.

Example III

Treating sugarcane juices with lime, and then heating and settling to give a cleared juice of a pH between 6.0 and 7.0; concentrating and crystallizing sugars therefrom; diluting the resulting molasses to 26° to 30° Baumé with water; adding milk of lime solution to give a pH of 6.9 after heating to above 60° C.; separating, washing, and drying the aconitate formed, and returning the molasses so treated to the crystallizing process.

Example IV

Treating sugarcane juices with lime, and then heating and settling to give a cleared juice of pH between 6.0 and 7.0; concentrating and crystallizing sugars therefrom; diluting the resulting molasses to 26° to 30° Baumé with water; heating to above 60° C.; allowing the aconitate to settle; decanting the supernatant molasses; adding 10 to 40 percent of calcium chloride equivalent to the aconitic acid radical contained in the molasses and sufficient milk of lime solution so that a pH of 6.9 is obtained in the molasses after heating to above 60° C.; separating the aconitate formed and returning the treated molasses to the crystallizing process.

Example V

Treating sugarcane juices with lime, and then heating and settling to give a cleared juice of a pH between 6.0 and 7.0; concentrating and crystallizing sugars therefrom; diluting the resulting molasses to 28° to 30° Baumé with water; adding calcium chloride in an amount of 10 to 40 percent of the aconitic acid equivalent of the molasses and milk of lime solution to raise the pH to a value that when subsequently heated has a pH of 6.7 to 7.0; settling, separating, and washing the aconitate, and returning the treated molasses again to the crystallizing process.

Other soluble calcium salts may be used as disclosed in the above mentioned Ventre et al. patents.

Having thus described my invention, I claim:

1. A process for the recovery of aconitic acid from sugarcane juice, comprising treating the sugarcane juice with lime and heating to yield a clarified juice having a pH of from 6 to 7, concentrating the juice and crystallizing the sugars therefrom; diluting the molasses with water, heating the diluted molasses, allowing the aconitates to settle, adding a calcium salt, which salt is soluble in the liquid and reacts with the combined aconitic acid to form calcium aconitate, in an amount that is the chemical equivalent of 10 to 40 percent of the aconitic acid radical contained in the supernatant molasses, adding milk of lime in an amount such that, after again raising the temperature to above 60° C. and allowing the aconitate to precipitate, the supernatant molasses has a pH of 6.8 to 7.

2. A process for the recovery of sugar and aconitic acid from sugarcane juice, comprising the steps recited in claim 1 and in which the last said molasses is returned to the crystallizing process.

3. The process of claim 1 in which the calcium salt is calcium chloride.

4. The process of claim 1 in which the calcium salt is calcium chloride and the molasses to which the calcium chloride is added is "B" molasses.

EMIL K. VENTRE.

REFERENCES CITED

The following references are of record in the file of this patent:

UNITED STATES PATENTS

| Number | Name | Date |
|---|---|---|
| 2,280,085 | Ventre et al. | Apr. 21, 1942 |
| 2,359,537 | Ventre | Oct. 3, 1944 |

OTHER REFERENCES

McCalip et al. Ind. and Eng. Chem., May 1941, page 637.

Spencer-Meade, "Sugar Handbook," N. Y. 1945, pages 24 and 25. (Copy in Division 43.)